United States Patent
Carl, Jr. et al.

[19]

[11] Patent Number: 6,023,052
[45] Date of Patent: Feb. 8, 2000

[54] HEATER CONTROL

[75] Inventors: Frederick Gordon Carl, Jr.; William Mountjoy Savage, both of Houston; Robert Rex Burnett, Katy, all of Tex.

[73] Assignee: Shell Oil Company, Houston, Tex.

[21] Appl. No.: 09/185,881

[22] Filed: Nov. 4, 1998

Related U.S. Application Data

[60] Provisional application No. 60/064,758, Nov. 7, 1997.

[51] Int. Cl.[7] .................................................. H05B 1/02
[52] U.S. Cl. ........................ 219/483; 219/486; 219/494; 219/508; 340/310.02; 307/38
[58] Field of Search .................................... 219/483–486, 219/501, 508, 507, 494; 307/39–41; 340/310.01, 310.02

[56] References Cited

U.S. PATENT DOCUMENTS

| | | | |
|---|---|---|---|
| 4,090,062 | 5/1978 | Phillips et al. | 219/486 |
| 4,348,582 | 9/1982 | Budek | 219/486 |
| 4,777,350 | 10/1988 | Crockett et al. | 219/497 |
| 4,874,926 | 10/1989 | Sanders | 219/483 |
| 5,060,287 | 10/1991 | van Egmond | 392/301 |
| 5,065,818 | 11/1991 | Van Egmond | 166/60 |
| 5,164,660 | 11/1992 | Carl Jr. et al. | 324/132 |
| 5,189,283 | 2/1993 | Carl Jr. et al. | 219/497 |
| 5,361,982 | 11/1994 | Liebl et al. | 236/46 R |
| 5,396,047 | 3/1995 | Schilling et al. | 219/449 |
| 5,404,952 | 4/1995 | Vinegar et al. | 166/303 |
| 5,454,259 | 10/1995 | Ishii et al. | 73/118.1 |
| 5,579,821 | 12/1996 | Vander Jagt | 164/76.1 |
| 5,582,756 | 12/1996 | Koyama | 219/497 |
| 5,589,092 | 12/1996 | Chang | 219/506 |
| 5,648,982 | 7/1997 | Durrant et al. | 375/206 |
| 5,654,979 | 8/1997 | Levin et al. | 375/206 |
| 5,657,379 | 8/1997 | Honda et al. | 379/93.28 |
| 5,659,574 | 8/1997 | Durrant et al. | 375/206 |
| 5,659,779 | 8/1997 | Laird et al. | 395/200.56 |

*Primary Examiner*—Mark Paschall
*Attorney, Agent, or Firm*—Del S. Christensen

[57] ABSTRACT

A method and apparatus are provided for controlling parallel heater elements, the method including the steps of: providing a plurality of electrical heater elements; generating a plurality of temperature signals associated with a plurality of the heater elements; generating a control signal based on one or more temperature signals; providing an alternating current power supply connected to the electrical heater elements through a power transmission system; generating a signal when the voltage of the alternating current power supply passes through ground potential; blocking electrical power to a heater element starting when a zero detection signal is detected an ending when another zero detection signal is detected, for a fraction of the alternating current cycles in a time period, the fraction being a function of the control signal; and transmitting temperature control signals through the power transmission system.

20 Claims, 1 Drawing Sheet

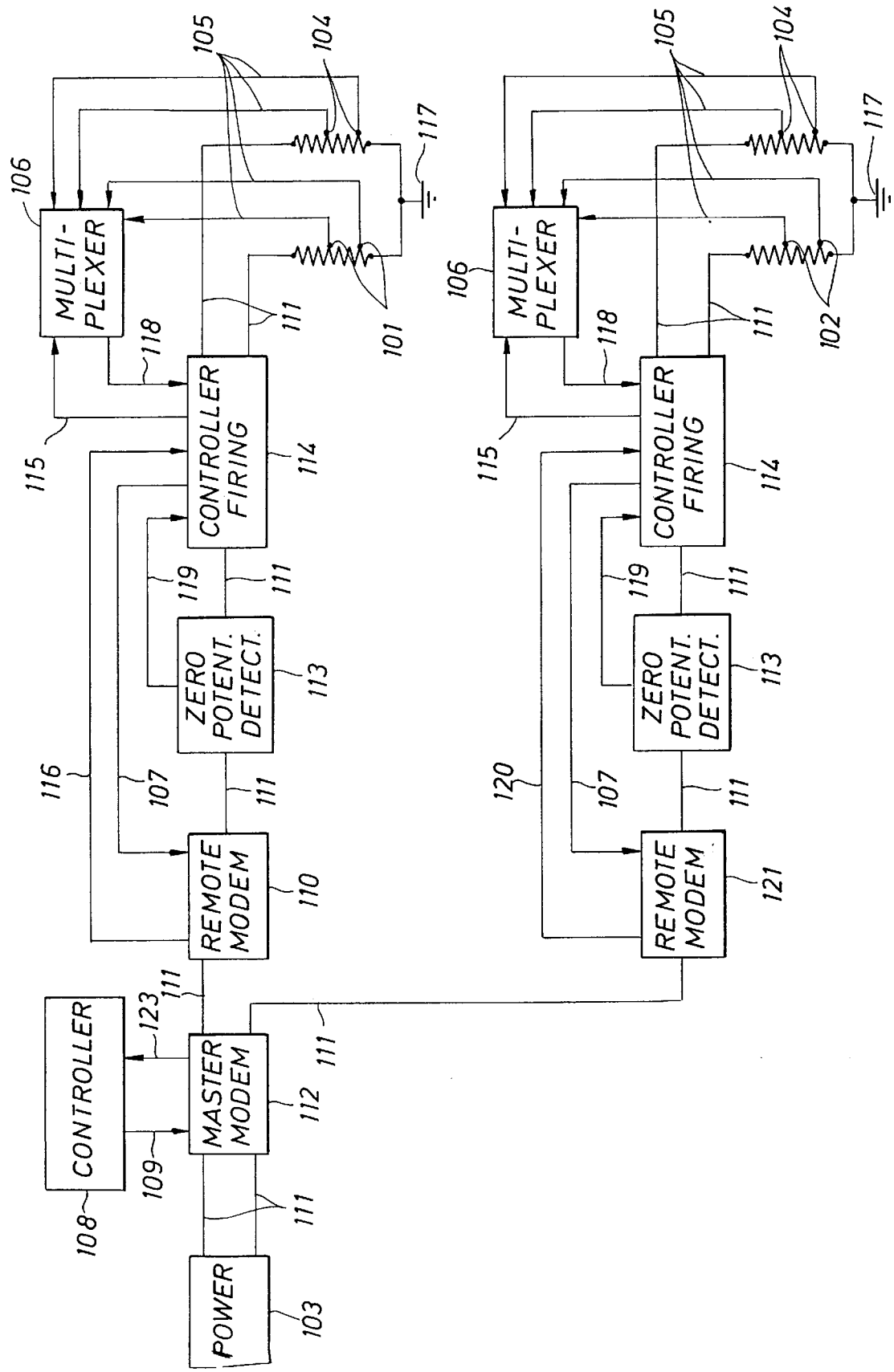

HEATER CONTROL

RELATED APPLICATIONS

This application claims priority to provisional application No. 60/064,758 filed Nov. 7, 1997.

FIELD OF THE INVENTION

This invention relates to a method and apparatus for control of a plurality of heaters.

BACKGROUND TO THE INVENTION

Heaters useful for heating of subterranean formations are disclosed in, for example, U.S. Pat. Nos. 5,060,287, and 5,404,952. Heating of soil or rock formations can be useful, for example, for recovery of hydrocarbons or removal of contaminates from soil. Control systems for electrical heaters such as these are discussed in, for example, U.S. Pat. No. 5,189,283, which discloses a control scheme for controlling a current control to a power control with a smooth cross-over control. U.S. Pat. No. 5,164,660 discloses a related method to measure power and current to such a heater.

Power to heaters such as these are advantageously powered by a zero-fired control such as those suggested in U.S. Pat. No. 4,777,350. A zero-fired control scheme passes full cycles of power, and then does not pass power for full cycles to a heater element, with the opening and closing of the electrical circuit occurring when the alternating power passes through neutral potential. U.S. Pat. No. 5,396,047 suggests an improvement to opening and closing the power circuit when the potential passes through the ground potential, the improvement being that at these times, power is switched between heater elements. Power therefore does not cut in and out, but only goes to a different element.

It is also known to transmit control signals through power lines as disclosed in, for example, U.S. Pat. No. 5,361,982.

Although there is considerable art available that is applicable to control of electrical heaters such as those of the present invention, an efficient and cost effective control system is still needed. It is therefore an object of the present invention to provide an efficient and cost effective control system for parallel heater elements.

SUMMARY OF THE INVENTION

These and other objects are accomplished by a system, and a method utilizing the system, the system comprising a plurality of electrical heater elements; a plurality of temperature sensors associated with a plurality of the heater elements effective to generate temperature signals; at least one temperature controller effective to generate a control signal based on one or more temperature signals; an alternating current power supply connected to the electrical heater elements through a power transmission system; a zero detection circuit effective to generate a generate a signal when the voltage of the alternating current power supply passes through ground potential; a firing controller that will block electrical power to a heater element, starting when a zero detection signal is detected an ending when another zero detection signal is detected, for a fraction of the alternating current cycles in a time period, the fraction being a function of the control signal; a remote modem in the proximity of the heater elements effective to convert the temperature signals to signals transmitted through the power transmission system and to detect a control signal transmitted through the power transmission system; and a master modem effective to convert the control signal to a signal transmitted through the power transmission system. This system preferably includes a multiplexing system to consolidate temperature data for transmission by the remote modem, and a polling system wherein the master modem transmits a que which prompts the remote modem to transmit specific data. In order to accommodate more modems within the power grid, and to reduce the effect of noise in the system, the modems preferably transmit over oscillating carrier signals which can be identified and tracked by the modem being communicated with. Thus interferences at a particular frequency will tend to be less disruptive.

BRIEF DESCRIPTION OF THE FIGURES

The FIGURE is a block diagram of the system of the present invention.

DESCRIPTION OF A PREFERRED EMBODIMENT

Referring now to the FIGURE, a control system for controlling parallel heater elements is shown. Electrical heater elements 101 and 102 are shown with two elements in each of two sets of elements, each set of heater elements being fired from a separate phase of alternating electrical power form power source 103, the electrical power transmitted through a power transmission system 111. In the practice of the present invention, each phase of alternating electrical power is preferably separately controlled as shown in the FIGURE, but each phase could also fire more than one heater element. Two heater elements are shown being fired from each firing controller. The elements could be fired in parallel, or could be fired separately, based on separate control temperatures. The heater elements are shown as both connected to ground 117 at the lower extremity of the heater elements. Temperature sensors 104 are shown, with four shown associated with each of the two sets of heater elements. Temperature signals 105 are generated by the temperature sensors and routed to a multiplexer 106. Two multiplexers are shown, one for each heater element, but it is not critical that separate multiplexers be provided for each heater element, and the multiplexers could be used to transmit other data in addition to temperature data. The multiplexers generate signals 118 which are a series of signals transmitted through a signal carrier. Typically these signals will be analog signals.

A temperature controller 108 is shown remote from the heater elements. A computer is preferably utilized as the temperature controller in order to provide both data logging, and control based on relatively complex criteria. Control signals 116 and 120 are generated by the controller based on the temperature signals. Remote modems 110 and 121 in the proximity of the two sets of heater elements convert temperature signals 107 from the firing controllers to signals transmitted through the power transmission system and detect a control signal transmitted through the power transmission system, and generates a stream of signals 116, based on the signals transmitted through the power transmission system. Each remote modem may be programmed to identify signals from the controller which are intended for the firing controller associated with that remote modem. A master modem 112 converts the control signals 109 to a signal transmitted through the power transmission system and detects temperature signals (and other signals originated by the remote modems) transmitted through the power transmission system, and communicates these detected signals to the controller as digital signals 123.

Zero detection circuits 113 generate a signal 119 when the voltage of the alternating current power supply passes through ground potential. A separate zero detection circuit is shown for each heater element, although, depending on the distance between the heaters, the same zero-potential signal may be used for different heater element controls. Firing controllers 114 block electrical power to a heater elements starting when a zero detection signal is detected an ending when another zero detection signal is detected, for a fraction of the alternating current cycles in a time period. This is referred to as zero firing. If firing is interrupted at a time when an electrical potential exists, noise in the electrical transmission system can be created. Zero firing is therefore a preferred way to control electrical heaters. The fraction of the alternating power cycles passing to the heater element is a function of the control signal. It is convenient that 100 cycles be used, representing one and two thirds seconds total cycle time. The precision of the control can therefore be to one half of a percent of the power available to the heater. Greater precision may, of course, be provided, but at the expense of extending the time of the cycle. The firing controllers 114 are also shown as accepting the signal from the multiplexer 118 and digitalizing this signal for sequencing to the remote modem. This function could be accomplished in a different manner, but it is convenient to provide the logic for digitalizing the signal from the multiplexer and to provide input for the remote modem, and to control the firing of the electrical heaters in one unit.

The firing controllers 114 also generate multiplexer control signals 115 for controlling the operation of the multiplexers 106.

A separate firing controller 114 is preferably provided for each heater element set in order to obtain the maximum benefit from the practice of the present invention. But depending on the desired voltages for each heater, the heaters may be provided in series, or parallel from the firing controller.

The master modem and the remote modem preferably communicate over an oscillating carrier signal. This is referred to as "spread spectrum" technology, and modems useful for transmitting and receiving data from power systems utilizing spread spectrum technology are commercially available. U.S. Pat. Nos. 5,659,779, 5,659,574, 5,657,379, 5,654,979, and 5,648,982, the disclosures of which are incorporated herein, disclose various configurations of spread spectrum technology.

The master modem preferably ques the remote modem to provide specific information. For example, temperatures may be updated based on the recent rate of change of the temperatures, so that heater elements that are stable will not be qued to provide temperature information as often as heater elements that are rapidly changing. Thus, when a computer is used as the controller, information can be provided to the computer according to the needs of the computer program.

When a computer is used as the controller, the computer may select a maximum temperature signal associated with each heater element, and control that maximum temperature.

A rectifier may be provided to convert the alternating current to direct current for the heater elements. This rectifier may be an integral piece of the firing controller, 114.

The present invention allows for control of individual heater elements while avoiding excessive amount of wire being needed. In heater applications such as remediation of soil (either insitu or excavated), and thermal recovery of oil from, for example, oil shale, tar sands, or diatomite, many heaters are required over a fairly widely scattered area. Wiring costs for these systems can be excessive if the desired thermocouples and controllers are each individually hard wired. Providing controllers on individual heater elements is also a very beneficial feature because each heating element must be keep at a temperature at which it will have an acceptably long service life. Thus, multiple thermocouples are generally provided to provide temperature readings at various locations along the heaters, and the power to the heater is controlled to maintain a maximum temperature at the hottest of the thermocouples. When a single controller is used for multiple heater elements, the heater elements other than the one with the hottest temperature are operating at a duty that is less than the duty of the heater element could be. In many applications, this is undesirable. For example, heat injection into soil for remediation can take longer when some of the heaters are operating at less than the desired temperature. The longer time for the remediation causes the expense to be greater because of the fixed costs for maintaining the operation. Further, when different phases of two or three phase power are controlled by the same controller, heat output may be less than it could be due to differences between voltages available from the different phases.

The components of the present invention are either commercially available at reasonable costs, or are easily assembled from available inexpensive components. By minimizing the lengths of thermocouple leads required, considerable cost savings can be realized.

Control of the heaters from a central computer, by communication to the heater firing controls through the power system, permits considerable optimization of the overall system. For example, alternating current cycles that are blocked to heaters may be blocked in a coordinated fashion which minimizes changes in the power load from cycle to cycle. This decreases the peak power required.

We claim:

1. A control system for controlling parallel heater elements comprising:

a plurality of electrical heater elements;

a plurality of temperature sensors associated with a plurality of the heater elements, the temperature sensors effective to generate temperature signals;

at least one temperature controller effective to generate a control signal based on at least one temperature signal;

an alternating current power supply connected to the electrical heater elements through a power transmission system;

a zero detection circuit effective to generate a signal when the voltage of the alternating current power supply passes through ground potential;

a firing controller that will block electrical power to a heater element, starting when a zero detection signal is detected an ending when another zero detection signal is detected, for a fraction of the alternating current cycles in a time period, the fraction being a function of the control signal;

a remote modem in the proximity of the heater elements effective to convert the temperature signals to signals transmitted through the power transmission system and to detect a control signal transmitted through the power transmission system; and a master modem effective to convert the control signal to a signal transmitted through the power transmission system and to detect temperature signals transmitted through the power transmission system.

2. The system of claim 1 wherein a plurality of controllers are provided, each controller controlling a different heating element.

3. The system of claim 1 wherein the master modem and the remote modem communicate over an oscillating carrier signal.

4. The system of claim 1 wherein the master modem ques the remote modem to provide specific information.

5. The system of claim 4 further comprising a computer, the computer connected to the master modem and effective to determine a control signal for control of a temperature signal.

6. The system of claim 5 wherein the computer selects a maximum temperature signal associated with each heater controller, and controls that maximum temperature.

7. The system of claim 1 further comprising a multiplexing element to which a plurality of temperature inputs are connected, and from which multiplexing element digital temperature signals are provided to the remote modem.

8. The system of claim 7 wherein the digital temperature signals are provided as a series of digital data.

9. The system of claim 8 further comprising a rectifier to provide direct current to the heater elements from the firing controller.

10. The system of claim 1 wherein each individual heater element has a separate firing controller.

11. A method for controlling parallel heater elements, the method comprising the steps of:

providing a plurality of electrical heater elements;

generating a plurality of temperature signals associated with a plurality of the heater elements;

generating a control signal based on one or more temperature signals;

providing an alternating current power supply connected to the electrical heater elements through a power transmission system;

generating a signal when the voltage of the alternating current power supply passes through ground potential;

blocking electrical power to a heater element starting when a zero detection signal is detected an ending when another zero detection signal is detected, for a fraction of the alternating current cycles in a time period, the fraction being a function of the control signal; and transmitting control signals through the power transmission system.

12. The method of claim 11 wherein a control signal is generated for each heating element.

13. The method of claim 11 wherein the temperature control signal is transmitted by an oscillating carrier signal.

14. The method of claim 11 wherein the temperature signals are transmitted to a temperature controller over power transmission system.

15. The method of claim 14 further wherein the control signal is generated by a computer, the computer effective to determine a control signal for control of a temperature signal.

16. The method of claim 15 wherein the computer selects a maximum temperature signal associated with each heater controller, and controls that maximum temperature.

17. The method of claim 11 further comprising multiplexing temperature signals associated with each heater element to provide a signal series of signals repeating digitalized temperature signals.

18. The method of claim 11 wherein the heater elements are heaters within wellbores for heating soil or rock formations.

19. The method of claim 18 wherein the heater elements are in wellbores for heating oil shale for extraction of hydrocarbons from the oil shale.

20. The method of claim 11 wherein the heaters are positioned to heat soil for removal of contaminates from the soil.

* * * * *